US007353174B2

(12) United States Patent
Menendez-Pidal et al.

(10) Patent No.: US 7,353,174 B2
(45) Date of Patent: *Apr. 1, 2008

(54) SYSTEM AND METHOD FOR EFFECTIVELY IMPLEMENTING A MANDARIN CHINESE SPEECH RECOGNITION DICTIONARY

(75) Inventors: Xavier Menendez-Pidal, Los Gatos, CA (US); Lei Duan, San Jose, CA (US); Jingwen Lu, San Jose, CA (US); Lex Olorenshaw, Half Moon Bay, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 823 days.

This patent is subject to a terminal disclaimer.

(21) Appl. No.: 10/403,747

(22) Filed: Mar. 31, 2003

(65) Prior Publication Data

US 2004/0193417 A1 Sep. 30, 2004

(51) Int. Cl.
*G10L 15/00* (2006.01)
*G10L 15/04* (2006.01)
*G10L 15/14* (2006.01)
*G10L 15/18* (2006.01)
*G10L 17/00* (2006.01)

(52) U.S. Cl. ............... 704/254; 704/244; 704/248; 704/256.1; 704/256.2; 704/257

(58) Field of Classification Search .......... 704/251, 704/253, 254, 256.1, 256.2
See application file for complete search history.

(56) References Cited

U.S. PATENT DOCUMENTS 4,370,521 A * 1/1983 Johnston et al. .......... 704/253
5,220,639 A * 6/1993 Lee ........................ 704/200
5,581,655 A * 12/1996 Cohen et al. ............. 704/245

(Continued)

FOREIGN PATENT DOCUMENTS

EP 71716 A2 * 2/1983

(Continued)

OTHER PUBLICATIONS

"A Phonetic Transcription System of Arabic Text" Heny Selim, Taghrid Anbar IEEE Acoustics, Speech and Signal Processing ICASSP-87 vol. 12 Apr. 1987 pp. 1446-1449.*

(Continued)

*Primary Examiner*—Richemond Dorvil
*Assistant Examiner*—Dorothy S Siedler
(74) *Attorney, Agent, or Firm*—Gregory J. Koerner; Redwood Patent Law (57) ABSTRACT

The present invention comprises a system and method for effectively implementing a Mandarin Chinese speech recognition dictionary, and may include a recognizer configured to compare input speech data to phone strings from a vocabulary dictionary that is implemented according to an optimized Mandarin Chinese phone set. The optimized Mandarin Chinese phone set may efficiently be implemented by utilizing an allophone and phonemic variation technique. In addition, the foregoing vocabulary dictionary may be implemented by utilizing unified dictionary optimization techniques to provide robust and accurate speech recognition. Furthermore, the vocabulary dictionary may be implemented as an optimized dictionary to accurately recognize either Northern Mandarin Chinese speech or Southern Mandarin Chinese speech during the speech recognition procedure.

41 Claims, 7 Drawing Sheets

U.S. PATENT DOCUMENTS 5,680,510 A * 10/1997 Hon et al. .................. 704/255
5,758,319 A * 5/1998 Knittle ....................... 704/251
6,510,410 B1 * 1/2003 Chen et al. ................. 704/251

FOREIGN PATENT DOCUMENTS

JP          01066790 A * 3/1989

OTHER PUBLICATIONS

"A New Frameowrk for Recognition of Mandarin Syllables with Tones Using Sub-syllabic Units" Chih-Heng Lin, Lin-Shan Lee, Peri-Yih IEEE Acoustics, Speech and Signal Processing ICASSP-93 vol. 2 Apr. 27-30, 1993 pp. 227-230.*

"Phonetically Guided Clustering for Islated Word Recognition" D. Mergel, H. Ney IEEE Acoustics, Speech and Signal Processing ICASSP-85 vol. 10 Apr. 1985 pp. 854-857.*

"Vocabulary Optimization Based on Perplexity" Kyuwoong Hwang IEEE Acoustics, Speech and Signal Processing ICASSP-97 vol. 2 Apr. 1997 pp. 1419-1422.*

Discrete Time Speech Signal Processing, Thomas E. Quatieri 2002 Prentice Hall PTR, Prentice Hall, Inc. Upper Saddle River, NJ 07458 Chapter 3 section 3.4.6 pp. 92-102.*

Liu et al, "Mandarin Accent Adaptation Based on Context-Independent/Contect-Dependent pronunciation modeling" IEEE International Conference on Acoustics, Speech and Signal Processing 2000, ICASSP-00, vol. 2, Jun. 5-9, 2000, pp. 1025-1028.*

Chen et al, "Tone Recognition of Continuous Mandarin Speech Based on Neural Networks" IEEE Transactions on Speech and Audio Processing, vol. 3, Mar. 1995, pp. 146-150.*

* cited by examiner

SYSTEM AND METHOD FOR EFFECTIVELY IMPLEMENTING A MANDARIN CHINESE SPEECH RECOGNITION DICTIONARY

BACKGROUND SECTION

1. Field of the Invention

This invention relates generally to electronic speech recognition systems, and relates more particularly to a system and method for effectively implementing a Mandarin Chinese speech recognition dictionary.

2. Description of the Background Art

Implementing a robust and efficient method for system users to interface with electronic devices is a significant consideration of system designers and manufacturers. Voice-controlled operation of electronic devices is a desirable interface for many system users. For example, voice-controlled operation allows a user to perform other tasks simultaneously. For instance, a person may operate a vehicle and operate an electronic organizer by voice control at the same time. Hands-free operation of electronic systems may also be desirable for users who have physical limitations or other special requirements.

Hands-free operation of electronic devices may be implemented by various speech-activated electronic systems. Speech-activated electronic systems thus advantageously allow users to interface with electronic devices in situations where it would be inconvenient or potentially hazardous to utilize a traditional input device. Electronic entertainment systems may also utilize speech recognition techniques to allow users to interact with a system by speaking to it.

However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively recognizes words and phrases in the Mandarin Chinese language may benefit from an efficient implementation because of the large amount and complexity of the digital data involved. Therefore, for all the foregoing reasons, implementing a robust and efficient method for a system user to interface with electronic devices remains a significant consideration of system designers and manufacturers.

SUMMARY

In accordance with the present invention, a system and method are disclosed for effectively implementing a Mandarin Chinese speech recognition dictionary. In one embodiment, a recognizer may be configured to compare input speech data to phone strings from a vocabulary dictionary that is implemented according to an optimized Mandarin Chinese phone set.

The optimized Mandarin Chinese phone set may be implemented with a phonetic technique to separately include consonantal phones and vocalic phones. For reasons of system efficiency, the optimized Mandarin Chinese phone set may preferably be implemented in a compact manner to include only a minimum required number of consonantal phones and vocalic phones to accurately represent Mandarin Chinese speech during the speech recognition procedure.

In accordance with certain embodiments of the present invention, the optimized Mandarin Chinese phone set may efficiently be implemented by utilizing an allophone variation technique that maps a plurality of allophones or pronunciation variations to the same corresponding phoneme from the optimized phone set. In certain embodiments, the allophone variation technique may map allophones into a phone set that includes a consonant category, a semi-vowel category, and a vowel category.

In addition, the foregoing vocabulary dictionary may be implemented by utilizing various dictionary optimization techniques to provide robust and accurate speech recognition. Regional variation techniques may map regional variations of input speech data to unified corresponding entries in the vocabulary dictionary to thereby improve speech recognition accuracy. Each of the regional variations of the input speech data may exhibit a significant pronunciation variation depending upon a geographical region. In certain embodiments, the regional variations of pronunciation may include Mandarin Chinese pronunciation variations from Northern Mandarin Chinese and Southern Mandarin Chinese.

Furthermore, in certain embodiments, the foregoing vocabulary dictionary may be implemented as a unified dictionary that corresponds to different specific regional pronunciation variations of a particular spoken language. The dictionary may then accurately recognize either Northern Mandarin Chinese speech or Southern Mandarin Chinese speech during the speech recognition procedure. The present invention thus provides an improved system and method for effectively implementing a Mandarin Chinese speech recognition dictionary.

DETAILED DESCRIPTION

The present invention relates to an improvement in speech recognition systems. The following description is presented to enable one of ordinary skill in the art to make and use the invention and is provided in the context of a patent application and its requirements. Various modifications to the preferred embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention comprises a system and method for effectively implementing a Mandarin Chinese speech recognition dictionary, and may include a recognizer configured to compare input speech data to phone strings from a vocabulary dictionary that is implemented according to an optimized Mandarin Chinese phone set. The optimized Mandarin Chinese phone set may efficiently be implemented by utilizing an allophone variation technique.

In addition, the foregoing vocabulary dictionary may be implemented by utilizing various dictionary optimization techniques to provide robust and accurate speech recognition. Furthermore, the vocabulary dictionary may be implemented as a dictionary set from which an appropriate dictionary may be selected to accurately recognize either Northern Mandarin Chinese speech or Southern Mandarin Chinese speech during the speech recognition procedure.

Figure 1:
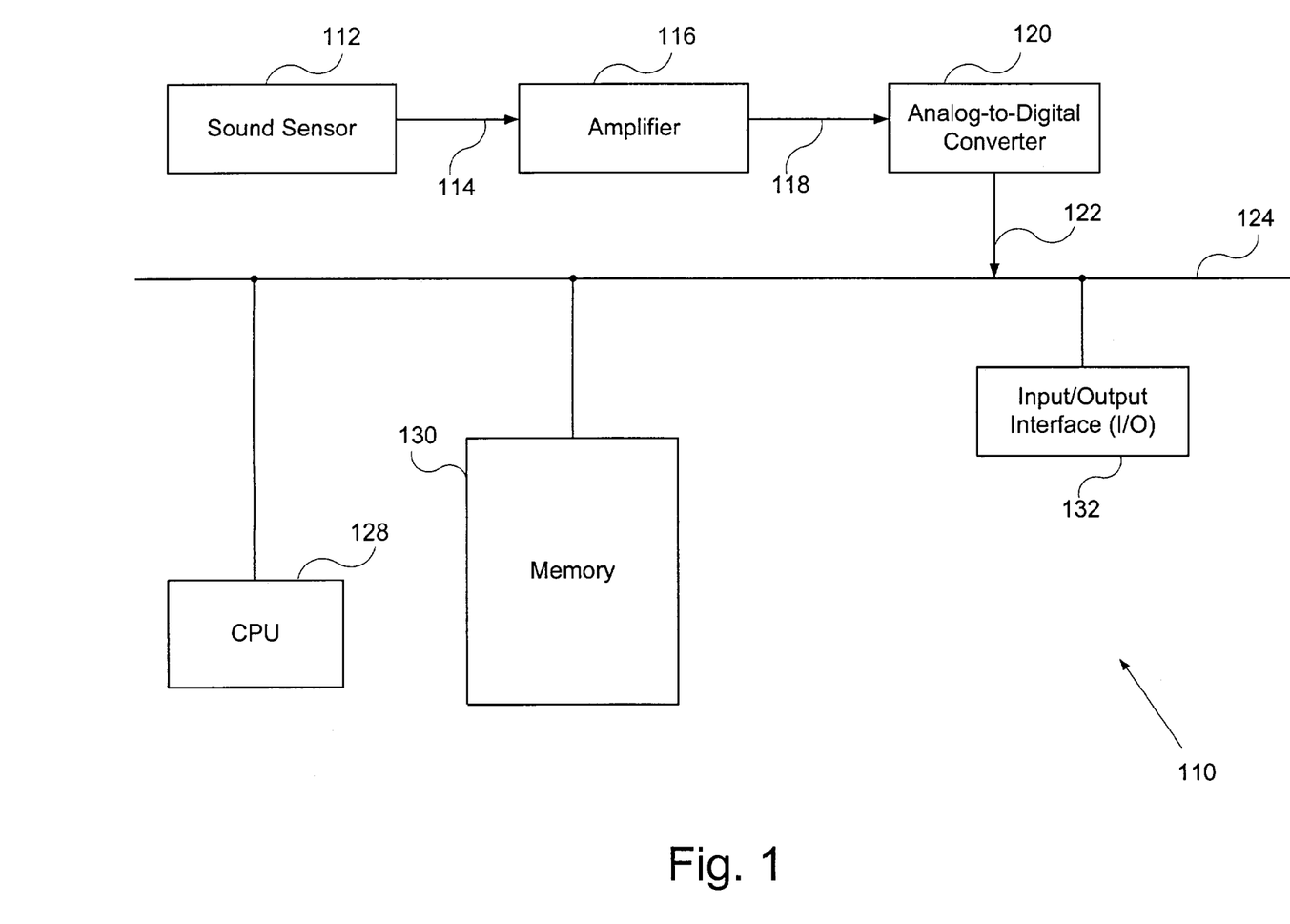
FIG. 1 is a block diagram for one embodiment of a computer system, in accordance with the present invention.

Referring now to FIG. 1, a block diagram for one embodiment of a computer system 110 is shown, according to the present invention. The FIG. 1 embodiment includes a sound sensor 112, an amplifier 116, an analog-to-digital converter 120, a central processing unit (CPU) 128, a memory 130, and an input/output interface 132. In alternate embodiments, computer system 110 may readily include various other elements or functionalities in addition to, or instead of, those elements or functionalities discussed in conjunction with the FIG. 1 embodiment.

Sound sensor 112 detects sound energy and converts the detected sound energy into an analog speech signal that is provided via line 114 to amplifier 116. Amplifier 116 amplifies the received analog speech signal and provides the amplified analog speech signal to analog-to-digital converter 120 via line 118. Analog-to-digital converter 120 then converts the amplified analog speech signal into corresponding digital speech data. Analog-to-digital converter 120 then provides the digital speech data via line 122 to system bus 124.

CPU 128 may then access the digital speech data on system bus 124 and responsively analyze and process the digital speech data to perform speech detection according to software instructions contained in memory 130. The operation of CPU 128 and the software instructions in memory 130 are further discussed below in conjunction with FIGS. 2-3. After the speech data is processed, CPU 128 may then provide the results of the speech detection analysis to other devices (not shown) via input/output interface 132. In alternate embodiments, the present invention may readily be embodied in various devices other than the computer system 110 shown in FIG. 1.

Figure 2:
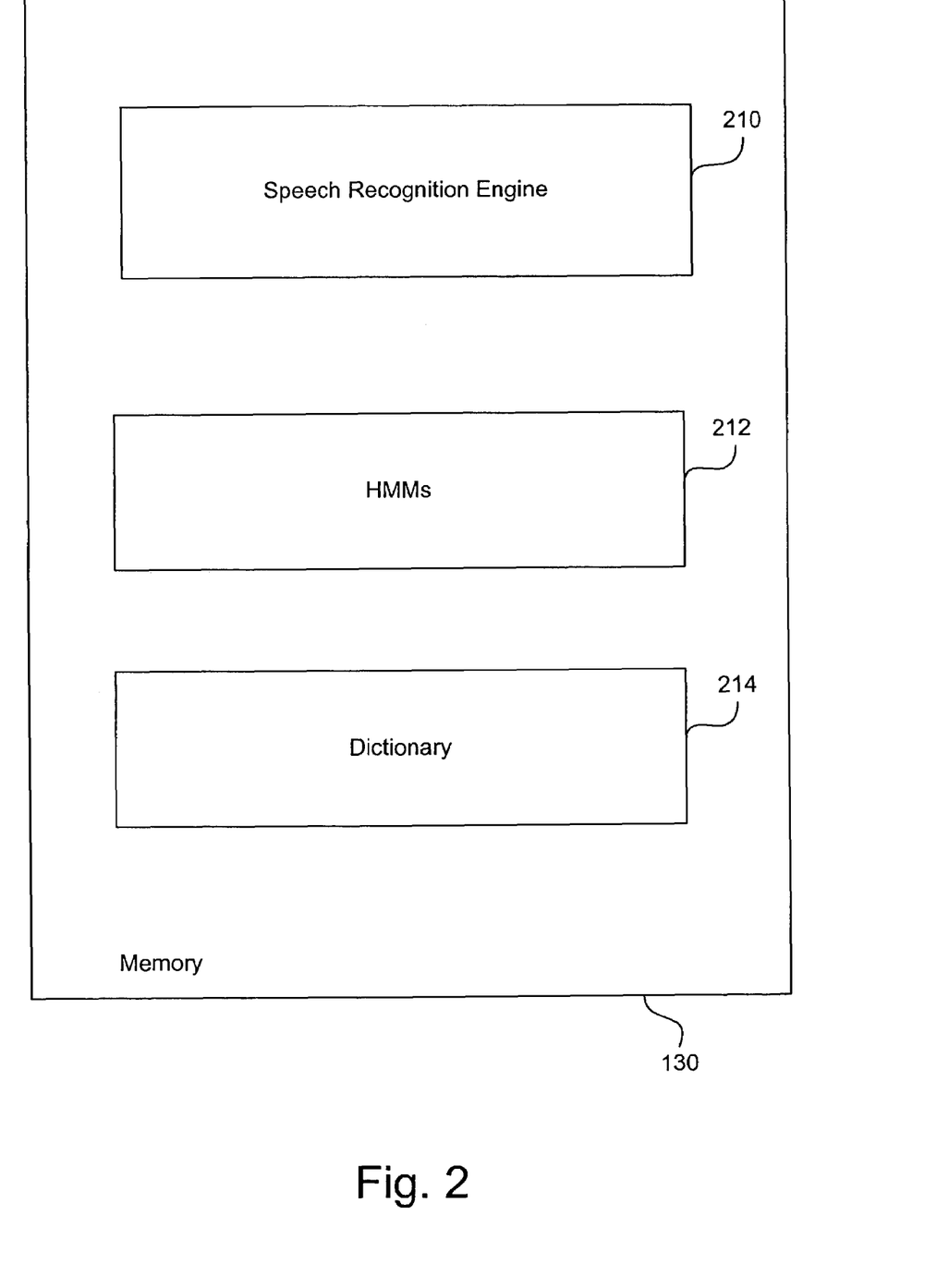
FIG. 2 is a block diagram for one embodiment of the memory of FIG. 1, in accordance with the present invention.

Referring now to FIG. 2, a block diagram for one embodiment of the memory 130 of FIG. 1 is shown, according to the present invention. Memory 130 may alternately comprise various storage-device configurations, including random access memory (RAM) and storage devices such as floppy discs or hard disc drives. In the FIG. 2 embodiment, memory 130 includes, but is not limited to, a speech recognition engine 210, Hidden Markov Models (HMMs) 212, and a vocabulary dictionary 214. In alternate embodiments, memory 130 may readily include various other elements or functionalities in addition to, or instead of, those elements or functionalities discussed in conjunction with the FIG. 2 embodiment.

In the FIG. 2 embodiment, speech recognition engine 210 includes a series of software modules that are executed by CPU 128 to analyze and recognize speech data, and which are further described below in conjunction with FIG. 3. In alternate embodiments, speech recognition engine 210 may readily be implemented using various other software and/or hardware configurations. HMMs 212 and dictionary 214 may be utilized by speech recognition engine 210 to implement the speech recognition functions of the present invention. One embodiment for HMMs 212 is further discussed below in conjunction with FIG. 4, and one embodiment for dictionary 214 is further discussed below in conjunction with FIG. 5.

Figure 3:
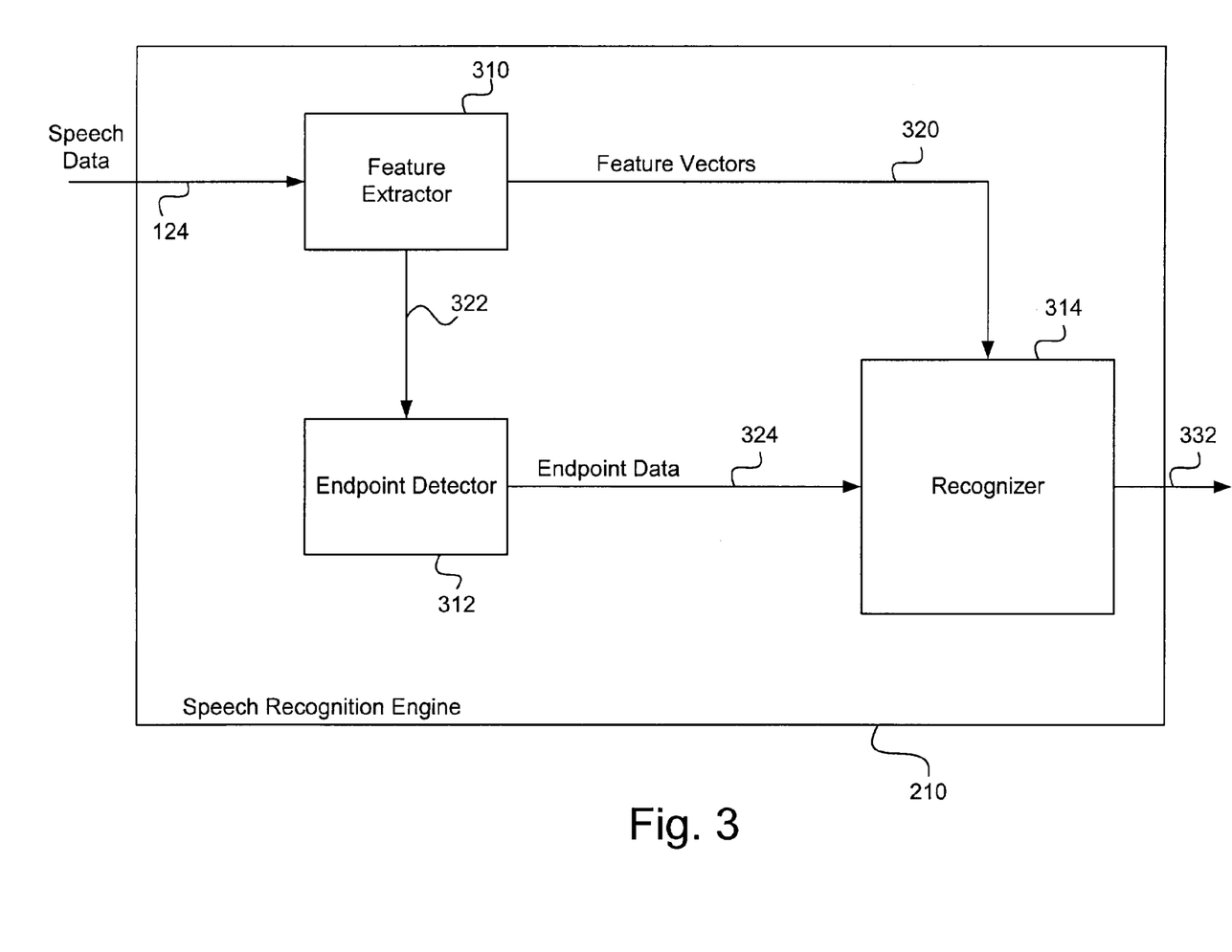
FIG. 3 is a block diagram for one embodiment of the speech detector of FIG. 2, in accordance with the present invention.

Referring now to FIG. 3, a block diagram for one embodiment of the speech recognition engine 210 of FIG. 2 is shown, according to the present invention. Speech recognition engine 210 includes, but is not limited to, a feature extractor 310, an endpoint detector 312, and a recognizer 314. In alternate embodiments, speech recognition engine 210 may readily include various other elements or functionalities in addition to, or instead of, those elements or functionalities discussed in conjunction with the FIG. 3 embodiment.

In the FIG. 3 embodiment, an analog-to-digital converter 120 (FIG. 1) provides digital speech data to feature extractor 310 via system bus 124. Feature extractor 310 responsively generates feature vectors, which are provided to recognizer 314 via path 320. Feature extractor 310 further responsively generates speech energy to endpoint detector 312 via path 322. Endpoint detector 312 analyzes the speech energy and responsively determines endpoints of an utterance represented by the speech energy. The endpoints indicate the beginning and end of the utterance in time. Endpoint detector 312 then provides the endpoints to recognizer 314 via path 324.

Recognizer 314 is preferably configured to recognize commands in a predetermined vocabulary which is represented in dictionary 214 (FIG. 2). The foregoing vocabulary commands in dictionary 214 may correspond to any desired commands, instructions, or other communications for computer system 110. Recognized vocabulary commands may then be output to system 110 via path 332.

In practice, each command from dictionary 214 may be associated with a corresponding phone string (string of individual phones) which represents that word. Hidden Markov Models (HMMs) 212 (FIG. 2) may include trained stochastic representations for each of the phones from a pre-determined phone set that may effectively be utilized to represent the commands in dictionary 214. Recognizer 314 may then compare input feature vectors from line 320 with appropriate HMMs 212 for each of the phone strings from dictionary 214 to determine which command produces the highest recognition score. The command corresponding to the highest recognition score may thus be identified as the recognized command.

Figure 4:
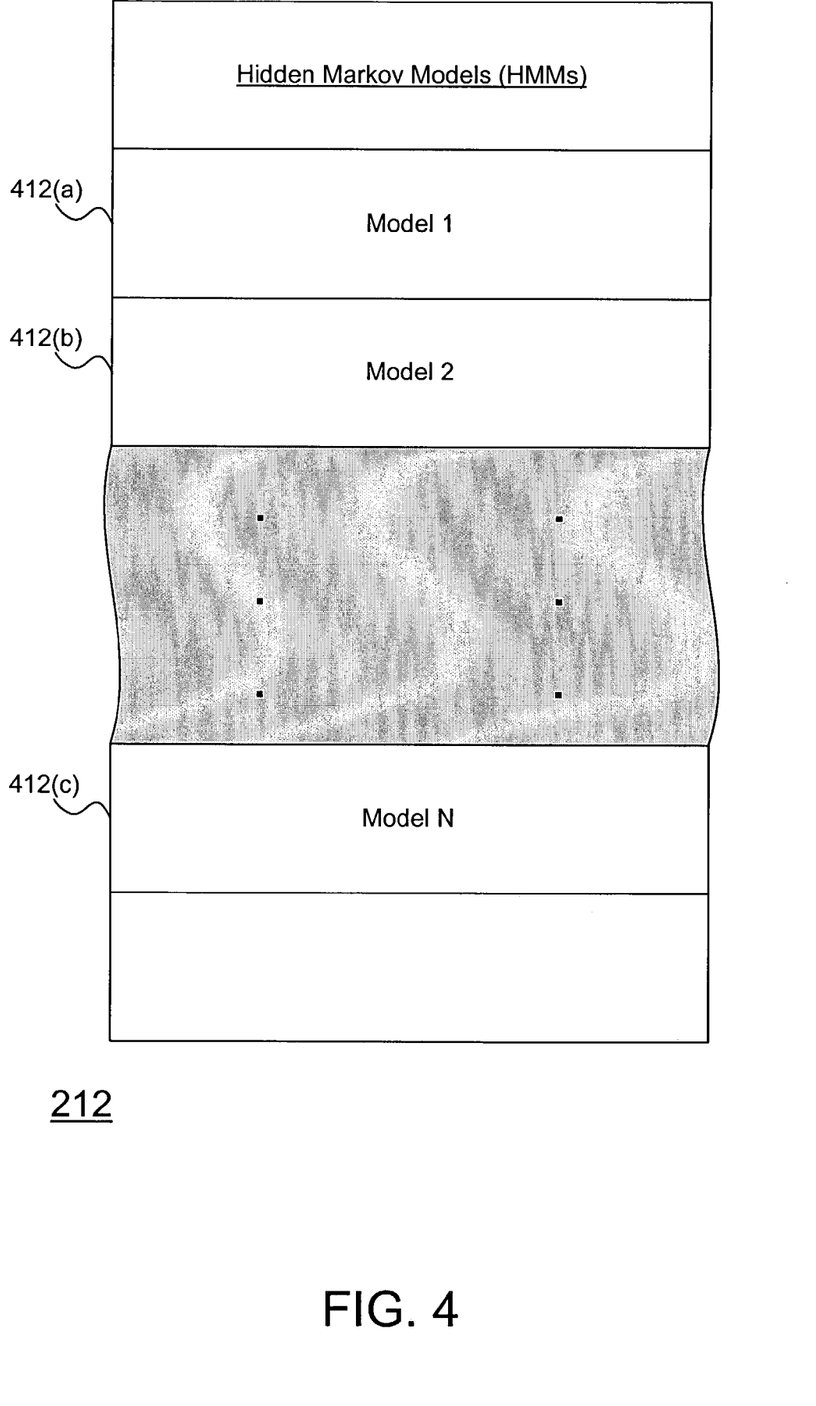
FIG. 4 is a diagram for one embodiment of the Hidden Markov Models of FIG. 2, in accordance with the present invention.

Referring now to FIG. 4, a block diagram for one embodiment of the HMMs 212 of FIG. 2 is shown, according to the present invention. In the FIG. 4 embodiment, HMMs 212 may preferably include a model 1 (412(a)) through a model N (412(c)). In alternate embodiments, HMMs 212 may readily include various other elements or functionalities in addition to, or instead of, those elements or functionalities discussed in conjunction with the FIG. 4 embodiment.

In the FIG. 4 embodiment, HMMs 212 may readily be implemented to include any desired number of models 412 that may include any required type of information. In the FIG. 5 embodiment, each model 412 from HMMs 212 may correspond to a different particular phone from a pre-determined phone set for use with recognizer 314 (FIG. 3).

Figure 5:
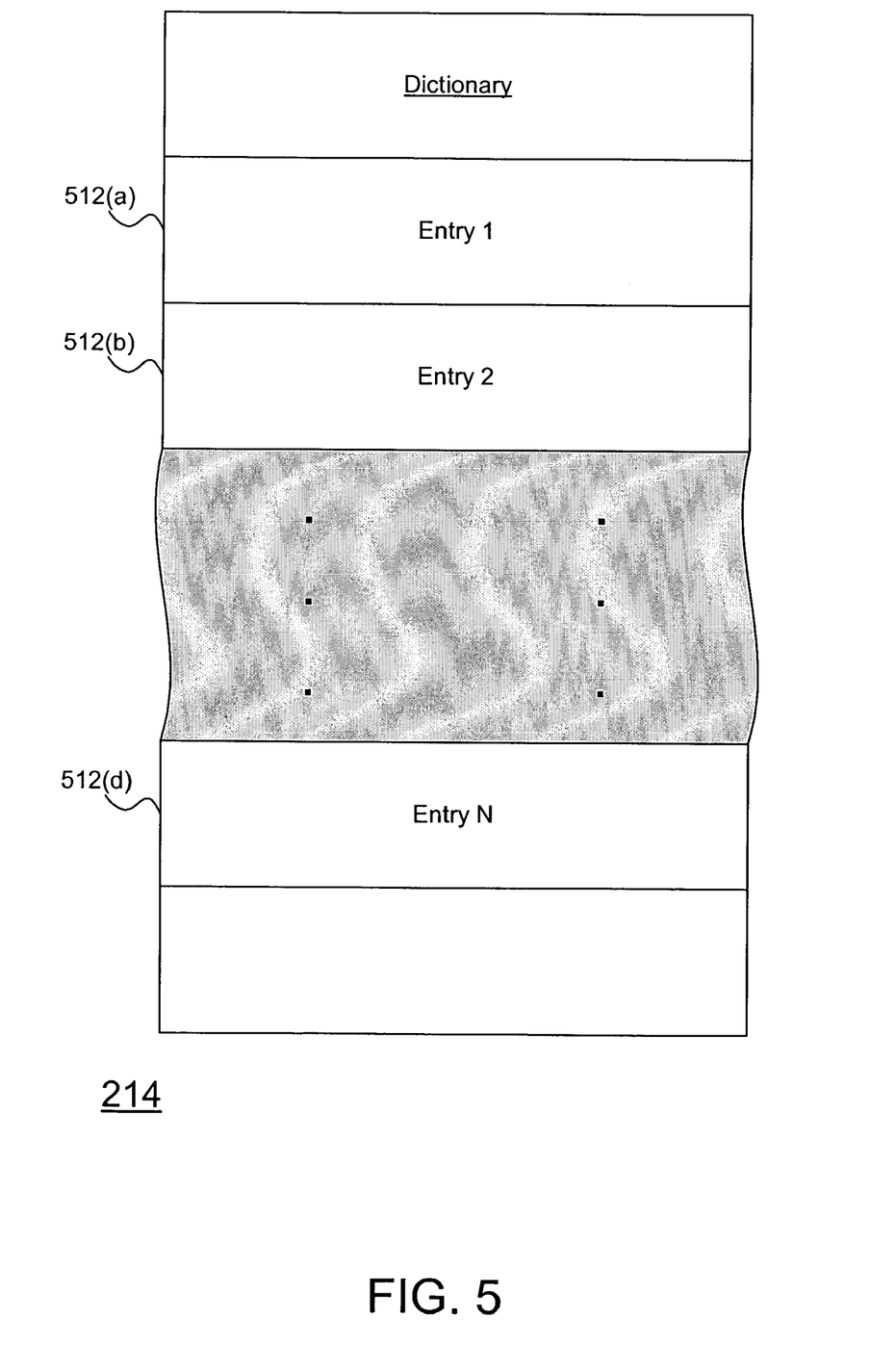
FIG. 5 is a diagram of one embodiment of the dictionary of FIG. 2, in accordance with the present invention.

Referring now to FIG. 5, a block diagram of the dictionary 214 of FIG. 2 is shown, in accordance with one embodiment of the present invention. In the FIG. 5 embodiment, dictionary 214 may preferably include an entry 1 (512(a)) through an entry N (512(d)). In alternate embodiments, dictionary 214 may readily include various other elements or functionalities in addition to, or instead of, those elements or functionalities discussed in conjunction with the FIG. 5 embodiment.

In the FIG. 5 embodiment, dictionary 214 may readily be implemented to include any desired number of entries 512 that may include any required type of information. In the FIG. 5 embodiment, as discussed above in conjunction with FIG. 3, each entry 512 from dictionary 214 may also include a corresponding phone string of individual phones from a pre-determined phone set. The individual phones of the foregoing phone string preferably form a sequential representation of the pronunciation of a corresponding word from dictionary 214. One embodiment of a dictionary entry 512 is further discussed below in conjunction with FIG. 6.

Figure 6:
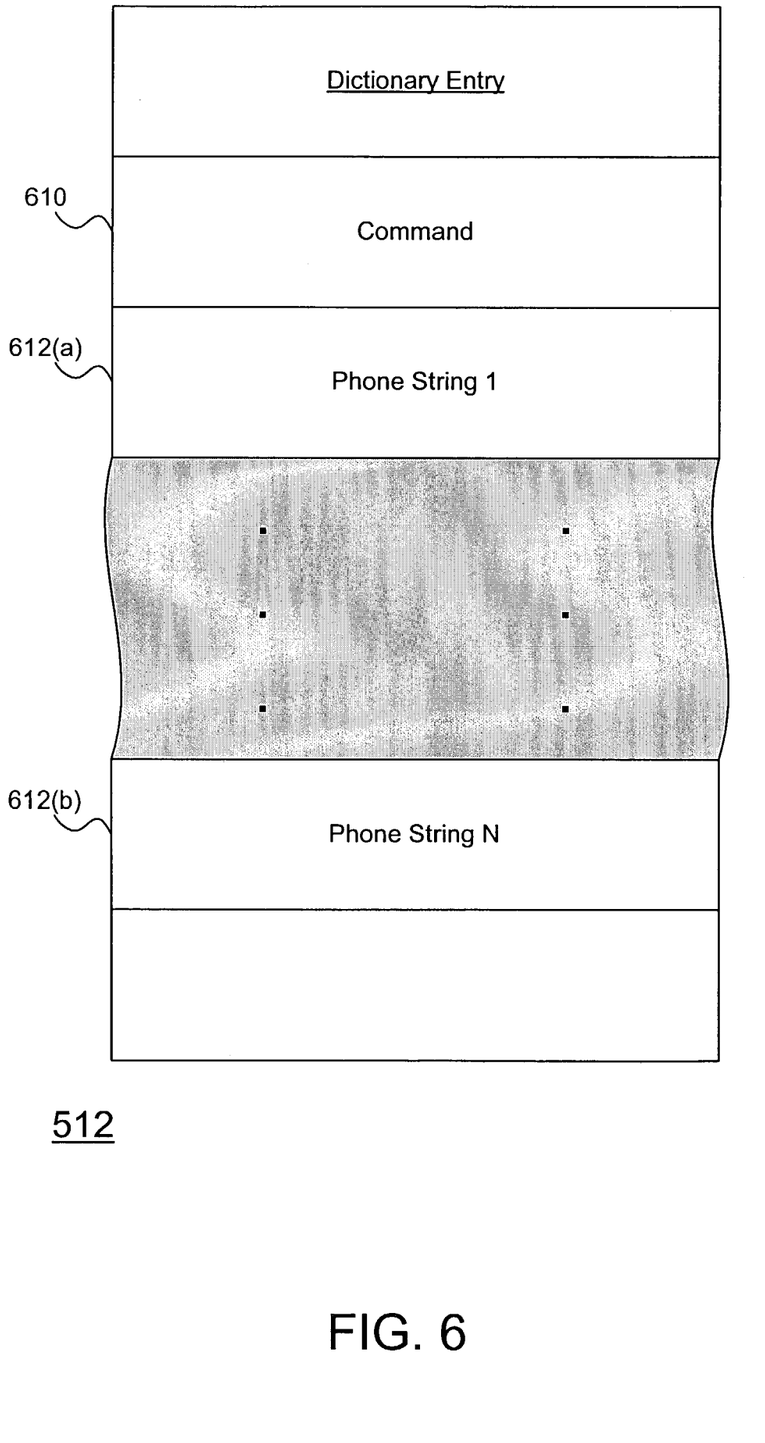
FIG. 6 is a diagram of a dictionary entry of FIG. 5, in accordance with one embodiment of the present invention.

Referring now to FIG. 6, a diagram of an exemplary FIG. 5 dictionary entry 512 is shown, in accordance with one embodiment of the present invention. In alternate embodiments, the present invention may readily perform speech recognition using dictionary entries with various other elements or functionalities in addition to, or instead of, those elements or functionalities discussed in conjunction with the FIG. 6 embodiment.

In the FIG. 6 embodiment, dictionary entry 512 may include a particular command 610 from a vocabulary that recognizer 314 (FIG. 3) is designed to recognize. In various embodiments, command 610 may be any type of utterance or speech, including a sentence, a phrase, a command, a question, or a word that may be represented according to an appropriate representation scheme. In addition, dictionary entry 512 may include phone strings 612 that represents the sequential aural characteristics of command 610. The phone strings 612 associated with command 610 may be comprised of a series of phones from a pre-determined phone set for use with recognizer 314. In the FIG. 6 embodiment, the foregoing phone strings may include a phone string 1 (612(a)) through a phone string N (612(b)). Each alternative phone string 612 may represent an alternative pronunciation of the same command 610 due to regional variations or pronunciation variations. One technique for implementing dictionary entries 512 is further discussed below in conjunction with FIG. 7.

Since Mandarin Chinese is typically written using Chinese characters instead of the Roman alphabet, the phone set may be presented by utilizing a standard Mandarin Chinese romanization scheme known as "pinyin". It should also be noted that the pinyin "ü" is represented as "yu" in the phoneset in order to facilitate computer keyboard usage. In alternate embodiments, the present invention may utilize optimized Mandarin Chinese phone sets that are represented in various other types of romanization schemes.

Because of the relatively small number of phones used, the phone set may provide an efficient and compact representation of phones for accurately recognizing Mandarin Chinese speech. The reduced number of separate phones in phone set provides significant conservation of processing resources and memory in electronic system 110. In addition, the reduced number of total phones substantially decreases the burden associated with training Hidden Markov Models (HMMs) 212. However, in various alternate embodiments, the present invention may be implemented to include various additional or different phones.

Conventional Mandarin Chinese speech recognition systems typically utilize a phone set which is implemented with a sub-syllabic approach in which each syllables are represented as rimes or half-syllables. In contrast, the optimized Mandarin Chinese phone set of the present invention advantageously utilizes a phonetic technique in which syllables are further divided into phonetic units that may be represented by combinations of appropriate consonantal phones and vocalic phones to provide greater granularity to the speech representation process. Furthermore, phone set represents the various sounds of the Mandarin Chinese language without utilizing corresponding tonal information as part of the different phones. In addition to providing greater flexibility, the foregoing phonetic technique also has the additional benefit of requiring fewer total phones in the phone set.

The foregoing Mandarin Chinese phone set and corresponding allophones may be organized into various linguistic categories depending upon characteristics of the corresponding phones. For purposes of illustration, one such organization is presented below as Table I which includes categories on the top with four columns below. The two columns on the left side of Table I are allophone columns with allophones that map into corresponding phonemes in the two phoneme columns on the right side of Table I. In Table I, equivalent allophones are shown on the same horizontal row (or on lower uninterrupted horizontal rows for additional allophone-phoneme mappings) as the corresponding phonemes of Table I.

The allophone column on the far left of Table I is presented in the foregoing Pinyin romanization format. In addition, in the second column from the left, Table I also includes an equivalent allophone column formatted in a second romanization scheme in accordance with a system developed by the International Phonetic Association (IPA). Further information regarding the International Phonetic Association may be found on the World Wide Web at www.arts.gla.ac.uk/IPA/fullchart.html. In alternate embodiments, allophones may also be organized in various ways that are different than that shown in the following Table I.

Furthermore, the phoneme column on the far right of Table I is presented in the foregoing Pinyin romanization format. In addition, in the second column from the right, Table I also includes an equivalent phoneme column formatted in the foregoing romanization scheme of the International Phonetic Association (IPA). In alternate embodiments, phonemes of the Mandarin Chinese phone set may also be organized in various ways that are different than that shown in the following Table I.

TABLE I

| Consonants: Pinyin | IPA | IPA | Pinyin |
|---|---|---|---|
| b(begin) | p | p | b |
| b(begin) | p_v | | |
| p(begin) | p_h | p_h | p |
| m(begin) | m | m | m |
| f(begin) | f | f | f |
| d(begin) | t | t | d |
| d(begin) | t_v | | |
| t(begin) | t_h | t_h | t |
| l(begin) | l˳ | l˳ | l |
| l(begin) | l˴ | | |
| l(begin) | L | | |
| g(begin) | k | k | g |
| g(begin) | k_v | | |
| k(begin) | k_h | k_h | k |
| h(begin) | x | x | h |
| h(begin) | x_v | | |
| j(begin) | C^ | C^ | j |

TABLE I-continued

| Consonants: Pinyin | IPA | IPA | Pinyin |
|---|---|---|---|
| q(begin) | C^_h | C^_h | q |
| x(begin) | C_ | C_ | x |
| zh(begin) | s^ | s^ | zh |
| zh(begin) | t^ | | |
| zh(begin) | S^ | | |
| ch(begin) | s^_h | s^_h | ch |
| ch(begin) | t^_h | | |
| ch(begin) | S^_h | | |
| sh(begin) | s^ | s^ | sh |
| sh(begin) | S | | |
| sh(begin) | s_ | | |
| r(begin) | r_ | r^_ | r |
| r(begin) | z^ | | |
| r(begin) | z_ | | |
| r(end) | r_ | r^_ | r |
| z(begin) | t^_ | t^ | z |
| z(begin) | s_ | | |
| z(begin) | S^ | | |
| c(begin) | t^_h | t^_h | c |
| s(begin) | s | s | s |
| n(begin, end) | n | n | n |
| n(begin, end) | J | | |
| ng(end) | N | N | ng |

*Note:
"begin" and "end" describe where the phoneme appears in Pinyin. For example, in Pinyin "ban", "b" is b(begin) and "n" is n(end).

| Semi-vowels: Pinyin | IPA | IPA | Pinyin |
|---|---|---|---|
| y | j | j | y |
| w | w | w | w |
| yu | H | H | yu |

| Vowels: Pinyin | IPA | IPA | Pinyin |
|---|---|---|---|
| a(ba) | A | a | a |
| a(ai, an) | a | | |
| a(ian) | E_ | | |
| a(yuan) | E^ | | |
| a(ao, ang) | 6 | | |
| a(angr) | A~ | | |
| o(bo) | uo | o | o |
| o(uo) | o | | |
| o(ao) | U | | |
| e(ge, strd) | 7 | e | e |
| e(ge, nstr) | @ | | |
| e(ei) | e | | |
| e(ie) | E_r | | |
| e(engr) | @~ | | |
| i | i | I | i |
| i | I | | |
| i(zhi) | 1` | | |
| i(zi) | 1 | | |
| u(lu) | u | u | u |
| u(lou) | U | | |
| yu(qu) | y | yu | yu |

Figure 7:
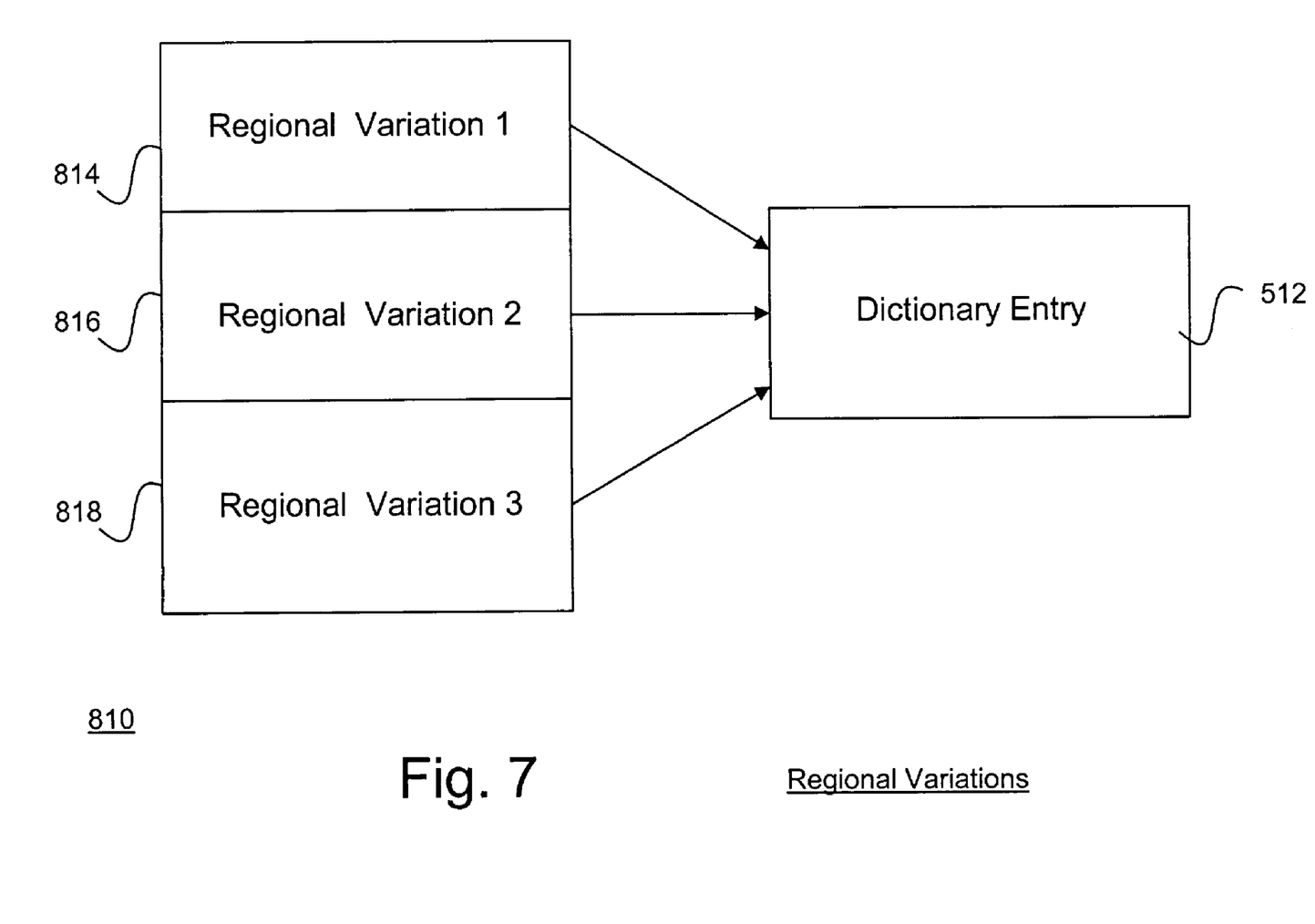
FIG. 7 is a diagram illustrating a regional variation technique, in accordance with one embodiment of the present invention.

Referring now to FIG. 7, a diagram 810 illustrating a regional variation technique is shown, in accordance with one embodiment of the present invention. In alternate embodiments, the present invention may readily utilize various other techniques or functionalities in addition to, or instead of, those techniques or functionalities discussed in conjunction with the FIG. 7 embodiment.

In many languages, pronunciation variations may exist depending upon various factors such as geographic region. For example, spoken Mandarin Chinese may exhibit significant pronunciation variations depending upon whether the speaker is from a northern region (Northern Mandarin Chinese) or the south of China (Southern Mandarin Chinese). The foregoing significant pronunciation variation may be determined to exceed a pre-defined variation threshold. In order to provide a robust and accurate Mandarin Chinese speech recognition system, the FIG. 7 diagram 810 shows a regional variation technique that may be utilized to improve recognition accuracy for significant regional variations in pronunciation.

In the FIG. 7 embodiment, for purposes of illustrating various principles of the present invention, diagram 810 shows a Mandarin Chinese regional variation 1 (814) that is mapped to a unified dictionary entry 512 in a vocabulary dictionary 214 (FIG. 2) for use by speech recognition engine 210. In addition, diagram 810 shows a Mandarin Chinese regional variation 2 (816) that is mapped to the same dictionary entry 512 in vocabulary dictionary 214 for use by speech recognition engine 210.

Furthermore, diagram 810 shows a Mandarin Chinese regional variation 3 (818) that is mapped to the same dictionary entry 512 in vocabulary dictionary 214 for use by speech recognition engine 210. In the FIG. 7 embodiment, regional variations may represent different pronunciation variations of a particular dictionary entry 512 used with speech recognition engine 210.

In certain embodiments, in accordance with the present invention, speech recognition engine 210 may also access a vocabulary dictionary that is specially designed to optimize speech recognition accuracy for a particular environment. For example, in certain embodiments, a Mandarin Chinese speech recognition dictionary may include Northern Mandarin Chinese entries 512 that correspond to different regional Northern Mandarin Chinese dialects.

In addition, in certain embodiments, a Mandarin Chinese speech recognition dictionary 214 may also include Southern Mandarin Chinese entries 512 that correspond to regional Southern Mandarin Chinese dialects. The foregoing Mandarin Chinese speech recognition dictionaries may also include entries 512 that are specifically designed to either facilitate recognition accuracy or to emphasize conservation of processing resources while performing the speech recognition procedures.

In certain embodiments of the present invention, various dictionary optimization techniques may be utilized to provide a more robust and accurate Mandarin speech recognition procedure. In one embodiment, the present invention may merge and include any appropriate free allophonic and phonemic variations. Certain Mandarin Chinese words or sounds may have alternative pronunciations which are not due to regional variations. For example nei4, zhe4, shei2, han4, huo0 may have alternative pronunciations as shown below in Table II.

TABLE II

| Common~Alternative |
|---|
| na4~nei4 |
| zhe4~zhei4 |
| shui2~shei2 |
| he2~han2 |
| he2~huo2 |

In accordance with certain embodiments of the present invention, corresponding dictionary entries 512 for the foregoing Mandarin Chinese words are shown in the following Table III:

TABLE III

| |
|---|
| na4 n a |
| na4 n ei (alternative pronunciation) |
| zhe4 sˆ e |
| zhe4 sˆ ei (alternative pronunciation) |
| shui2 s w ei |
| shui2 s ei (alternative pronunciation) |
| he2 x e |
| he2 x a n (alternative pronunciation) |
| he2 x e |
| he2 x w o (alternative pronunciation) |

In certain embodiments, vocabulary dictionary 214 may be implemented with various improvements to handle problematical Southern and Northern Mandarin dialectal variations. For example, certain Mandarin words or sounds are pronounced differently in Southern China as compared with pronunciation of the same word or sound in Northern China. For certain words, a final r (rˆ) may be pronounced in Northern China, while a corresponding final r may not be utilized in Southern China.

The following Table IV provides a list of certain Mandarin Chinese words or sounds which may include a final r in the Northern Chinese pronunciation.

TABLE IV

| |
|---|
| South~North |
| shi4~shir4 |
| bian1~bianr1 |
| pian4~pianr4 |
| ge1~ger1 |
| dian3~dianr3 |
| tian1~tianr1 |
| gou3~gour3 |
| ban4~banr4 |
| qiu2~qiur2 |
| wan2~wanr2 |
| zhao1~zhaor1 |

In accordance with certain embodiments of the present invention, corresponding dictionary entries 512 for the foregoing North-South Mandarin Chinese pairings are shown in the following Table V. The present invention may merge the North-South Mandarin Chinese pairings to a single corresponding word or meaning.

TABLE V

| |
|---|
| shir4 sˆ i |
| shir4 sˆ i r (Northern pronunciation) |
| bianr1 p j a n |
| bianr1 p j a n r (Northern pronunciation) |
| ger1 k e |
| ger1 k e r (Northern pronunciation) |
| dianr3 cl t j a n |
| dianr3 cl t j a n r (Northern pronunciation) |
| tianr1 cl th j a n |
| tianr1 cl th j a n r (Northern pronunciation) |
| gour3 cl k ow |
| gour3 cl k ow r (Northern pronunciation) |
| banr4 cl p a n |
| banr4 cl p a n r (Northern pronunciation) |
| wanr2 w a n |
| wanr2 w a n r (Northern pronunciation) |
| zhaor1 sˆ aw |
| zhaor1 sˆ aw r (Northern pronunciation) |

In certain embodiments of the present invention, certain affricate techniques may be employed when implementing vocabulary dictionary 214. For example, in Southern China, the affricate sˆ tends to be pronounced with a phoneme that is closer to the phoneme tˆ. Vocabulary dictionary 214 may thus include and merge the alternative Southern Mandarin Chinese pronunciation with the tˆ phone, to cover both Northern and Southern Mandarin Chinese pronunciations. For example, dictionary 214 may include a Northern affricate variation "lan2_zhu4 sil l a n cl sˆu sil" and a Southern affricate variation "lan2_zhu4 sil l a n cl tˆ u sil".

Furthermore, in Southern China, the fricative sˆ tends to be pronounced with a phoneme that is closer to the phoneme s. Vocabulary dictionary 214 may thus include and merge the alternative Southern Mandarin Chinese pronunciation with the s phone, to cover both Northern and Southern Mandarin Chinese pronunciations. For example, dictionary 214 may include a Northern fricative variation "shang4 sˆ a N" and a Southern fricative variation "shang4 s a N". Therefore, as discussed above, in certain embodiments of the present invention, various dictionary optimization techniques may be utilized to provide a more robust and accurate Mandarin speech recognition procedure.

The invention has been explained above with reference to preferred embodiments. Other embodiments will be apparent to those skilled in the art in light of this disclosure. For example, the present invention may readily be implemented using configurations and techniques other than those described in the preferred embodiments above. Additionally, the present invention may effectively be used in conjunction with systems other than those described above as the preferred embodiments. Therefore, these and other variations upon the preferred embodiments are intended to be covered by the present invention, which is limited only by the appended claims.

What is claimed is:

1. A system for performing a speech recognition procedure with an electronic device, comprising:
a recognizer configured to compare input speech data to phone strings from a vocabulary dictionary to thereby generate and output one or more recognized words from said vocabulary dictionary, said vocabulary dictionary being implemented according to an optimized phone set, each of said phone strings being implemented as a sequence of phonemes that are serially configured, said optimized phone set being implemented in a compact manner by utilizing an allophone variation technique that maps different pronunciations of said input speech data to a respective one of said phone strings, said vocabulary dictionary being implemented by utilizing one or more dictionary optimization techniques, said optimized phone set representing sounds of a Mandarin Chinese language without utilizing corresponding tonal information as part of different phones in said optimized phone set, said recognizer thus performing said speech recognition procedure without utilizing any type of tone data to thereby output said one or more recognized words as a final speech recognition result; and
a processor configured to control said recognizer to thereby perform said speech recognition procedure.

2. The system of claim 1 wherein said input speech data includes Mandarin Chinese language data, said optimized phone set being compactly configured to accurately represent said Mandarin Chinese language data.

3. The system of claim 1 wherein said recognizer and said processor are implemented as part of a consumer electronics device.

4. The system of claim 1 wherein said optimized phone set conserves processing resources and memory resources while performing said speech recognition procedure.

5. The system of claim 1 wherein said phone strings each include a different series of phones from said optimized phone set, each of said phone strings corresponding to a different respective word from said vocabulary dictionary.

6. The system of claim 5 wherein said recognizer compares said input speech data to Hidden Markov Models for said phone strings from said vocabulary dictionary to thereby select said one or more recognized words during said speech recognition procedure.

7. The system of claim 1 wherein said allophonic technique maps a plurality of allophones or phonemes for said different pronunciations to a single phone string of a corresponding dictionary entry.

8. The system of claim 7 wherein said plurality of allophones or phonemes includes pronunciation variations for said dictionary entry based upon geographic pronunciation variations.

9. The system of claim 7 wherein said optimized phone set is implemented with a phonetic technique to separately provide consonantal phones and vocalic phones, said optimized phone set being implemented in a compact manner to include only a minimum required number of said consonantal phones and said vocalic phones.

10. The system of claim 1 wherein said regional variation technique maps regional variations of said input speech data to a corresponding entry in said vocabulary dictionary.

11. The system of claim 10 wherein each of said regional variations of said input speech data exhibits a significant pronunciation variation depending upon a geographical region, said significant pronunciation variation being determined to exceed a pre-defined acceptable variation threshold.

12. The system of claim 11 wherein said regional variations include Mandarin Chinese pronunciation variations from Northern Mandarin Chinese and from Southern Mandarin Chinese.

13. The system of claim 1 wherein said vocabulary dictionary is implemented as a unified dictionary set that includes first dictionary entries that correspond to a first specific regional pronunciation variation of a particular spoken language, and second dictionary entries that correspond to a second specific regional pronunciation variation of said particular spoken language, said first specific regional pronunciation including a Northern Mandarin Chinese pronunciation variation, said second specific regional pronunciation including a Southern Mandarin Chinese pronunciation variation.

14. The system of claim 1 wherein said vocabulary dictionary includes and merges separate entries for free phonemic or allophonic variations that have alternative pronunciations which are not due to regional variations.

15. The system of claim 14 wherein said free phonemic variations comprise a series of pronunciation variation pairs that include a na4~nei4 pair, a zhe4~zhei4 pair, a shui2~shei2 pair, a he2~han2 pair, and a he2~huo2 pair.

16. The system of claim 1 wherein said vocabulary dictionary includes and merges separate dictionary entries for South-North Mandarin dialectal variation pairs in which a final r may be pronounced in Northern China, while said final r may not be utilized in Southern China.

17. The system of claim 16 wherein said North-South Mandarin dialectal variation pairs include a shi4~shir4 pair, a bian1~bianr1 pair, a pian4~pianr4 pair, a ge1~ger1 pair, a dian3~dianr3 pair, a tian1~tianr1 pair, a gou3~gour3 pair, a ban4~banr4 pair, a qiu2~qiur2 pair, a wan2~wan2 pair, and a zhao1~zhao1 pair.

18. The system of claim 1 wherein an affricate technique is employed for implementing said vocabulary dictionary to include and merge an alternative Southern Mandarin Chinese pronunciation of an affricate sˆ with a phoneme tˆ, because, in Southern China, said affricate sˆ is pronounced closer to said phone tˆ, said affricate technique thus handling both a Northern Mandarin pronunciation and a Southern Mandarin pronunciation of said affricate sˆ.

19. The system of claim 1 wherein a fricative technique is employed for implementing said vocabulary dictionary to include and merge an alternative Southern Mandarin Chinese pronunciation of a fricative sˆ with a phoneme s, because, in Southern China, said fricative sˆ is pronounced closer to said phone s, said fricative technique thus handling both a Northern Mandarin pronunciation and a Southern Mandarin pronunciation of said fricative sˆ.

20. A method for performing a speech recognition procedure with an electronic device, comprising the steps of:
configuring a recognizer to compare input speech data to phone strings from a vocabulary dictionary to thereby generate and output one or more recognized words from said vocabulary dictionary, said vocabulary dictionary being implemented according to an optimized phone set, each of said phone strings being implemented as a sequence of phonemes that are serially configured, said optimized phone set being implemented in a compact manner by utilizing an phonemic and allophonic variation technique that maps different pronunciations of said input speech data to a respective one of said phone strings, said vocabulary dictionary being implemented by utilizing one or more dictionary optimization techniques, said optimized phone set representing sounds of a Mandarin Chinese language without utilizing corresponding tonal information as part of different phones in said optimized phone set, said recognizer thus performing said speech recognition procedure without utilizing any type of tone data to thereby output said one or more recognized words as a final speech recognition result; and
controlling said recognizer with a processor to thereby perform said speech recognition procedure.

21. The method of claim 20 wherein said input speech data includes Mandarin Chinese language data, said optimized phone set being compactly configured to accurately represent said Mandarin Chinese language data.

22. The method of claim 20 wherein said recognizer and said processor are implemented as part of a consumer electronics device.

23. The method of claim 20 wherein said optimized phone set conserves processing resources and memory resources while performing said speech recognition procedure.

24. The method of claim 20 wherein said phone strings each include a different series of phones from said optimized phone set, each of said phone strings corresponding to a different respective word from said vocabulary dictionary.

25. The method of claim 24 wherein said recognizer compares said input speech data to Hidden Markov Models for said phone strings from said vocabulary dictionary to thereby select during said speech recognition procedure.

26. The method of claim 20 wherein said allophonic variation technique maps a plurality of allophones or phonemes for said different pronunciations to a single phone string of a corresponding dictionary entry.

27. The method of claim 26 wherein said plurality of allophones or phonemes include pronunciation variations for said corresponding dictionary entry based upon geographic pronunciation variations.

28. The method of claim 26 wherein said optimized phone set is implemented with a phonetic technique to separately provide consonantal phones and vocalic phones, said optimized phone set being implemented in a compact manner to include only a minimum required number of said consonantal phones and said vocalic phones.

29. The method of claim 20 wherein said regional variation technique maps regional variations of said input speech data to a corresponding entry in said vocabulary dictionary.

30. The method of claim 29 wherein each of said regional variations of said input speech data exhibits a significant pronunciation variation depending upon a geographical region, said significant pronunciation variation being determined to exceed a pre-defined acceptable variation threshold.

31. The method of claim 30 wherein said regional variations include Mandarin Chinese pronunciation variations from Northern Mandarin Chinese and from Southern Mandarin Chinese.

32. The method of claim 20 wherein said vocabulary dictionary is implemented as a unified dictionary set that includes first dictionary entries that correspond to a first specific regional pronunciation variation of a particular spoken language, and second dictionary entries that correspond to a second specific regional pronunciation variation of said particular spoken language, said first specific regional pronunciation including a Northern Mandarin Chinese pronunciation variation, said second specific regional pronunciation including a Southern Mandarin Chinese pronunciation variation.

33. The method of claim 20 wherein said vocabulary dictionary includes and merges separate entries for free phonemic or allophonic variations that have alternative pronunciations, which are not due to regional variations.

34. The method of claim 33 wherein said free phonemic variations comprise a series of pronunciation variation pairs that include a na4~nei4 pair, a zhe4~zhei4 pair, a shui2~shei2 pair, a he2~han2 pair, and a he2~huo2 pair.

35. The method of claim 20 wherein said vocabulary dictionary includes and merges separate dictionary entries for South-North Mandarin dialectal variation pairs in which a final r may be pronounced in Northern China, while said final r may not be utilized in Southern China.

36. The method of claim 35 wherein said North-South Mandarin dialectal variation pairs include a shi4~shir4 pair, a bian1~bianr 1 pair, a pian4~pianr4 pair, a ge1~ger1 pair, a dian3~dianr3 pair, a tian1~tianr1 pair, a gou3~gour3 pair, a ban4~banr4 pair, a qiu2~qiur2 pair, a wan2~wanr2 pair, and a zshao1 pair.

37. The method of claim 20 wherein an affricate technique is employed for implementing said vocabulary dictionary to include and merge an alternative Southern Mandarin Chinese pronunciation of an affricate sˆwith a phone tˆ, because, in Southern China, said affricate sˆis pronounced closer to said phone tˆ, said affricate technique thus handling both a Northern Mandarin pronunciation and a Southern Mandarin pronunciation of said affricate sˆ.

38. The method of claim 20 wherein a fricative technique is employed for implementing said vocabulary dictionary to include and merge an alternative Southern Mandarin Chinese pronunciation of a fricative sˆ with a phone s, because, in Southern China, said fricative sˆ is pronounced closer to said phone s, said fricative technique thus handling both a Northern Mandarin pronunciation and a Southern Mandarin pronunciation of said fricative sˆ.

39. A computer-readable medium encoded with a computer program for performing a speech recognition, by performing the steps of:

configuring a recognizer to compare input speech data to phone strings from a vocabulary dictionary to thereby generate and output one or more recognized words from said vocabulary dictionary, said vocabulary dictionary being implemented according to an optimized phone set, each of said phone strings being implemented as a sequence of phonemes that are serially configured, said optimized phone set being implemented in a compact manner by utilizing a phonemic and allophonic variation technique that maps different pronunciations of said input speech data to a respective one of said phone strings, said vocabulary dictionary being implemented by utilizing one or more dictionary optimization techniques, said optimized phone set representing sounds of a Mandarin Chinese language without utilizing corresponding tonal information as part of different phones in said optimized phone set, said recognizer thus performing said Cantonese speech recognition procedure without utilizing any type of tone data to thereby output said one or more recognized words as a final speech recognition result; and controlling said recognizer with a processor to thereby perform said speech recognition procedure.

40. A system for performing a speech recognition procedure with an electronic device, comprising:

means for comparing input speech data to phone strings from a vocabulary dictionary to thereby generate and output one or more recognized words from said vocabulary dictionary, said vocabulary dictionary being implemented according to an optimized phone set, each of said phone strings being implemented as a sequence of phonemes that are serially configured, said optimized phone set being implemented in a compact manner by utilizing a phonemic and allophonic variation technique that maps different pronunciations of said input speech data to a respective one of said phone strings, said vocabulary dictionary being implemented by utilizing one or more dictionary optimization techniques, said optimized phone set representing sounds of a Mandarin Chinese language without utilizing corresponding tonal information as part of different phones in said optimized phone set, said means for comparing thus performing said speech recognition procedure without utilizing any type of tone data to thereby output said one or more recognized words as a final speech recognition result; and means for controlling said means for comparing to thereby perform said speech recognition procedure.

41. The system of claim 1 wherein said optimized phone set includes only phones b, p, m, f, d, t, l, g, k, h, j, q, x, zh, ch, sh, r, z, c, s, n, ng, y, w, yu, a, o, e, i, u, and yu.

* * * * *